(Model.)
I. F. & R. G. WARD.
ANIMAL POKE.
No. 246,355.                    Patented Aug. 30, 1881.
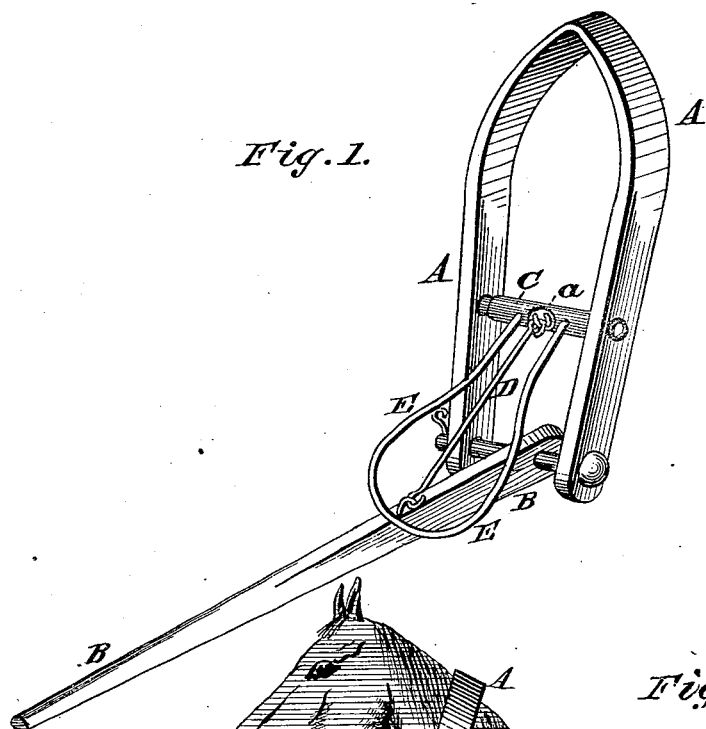
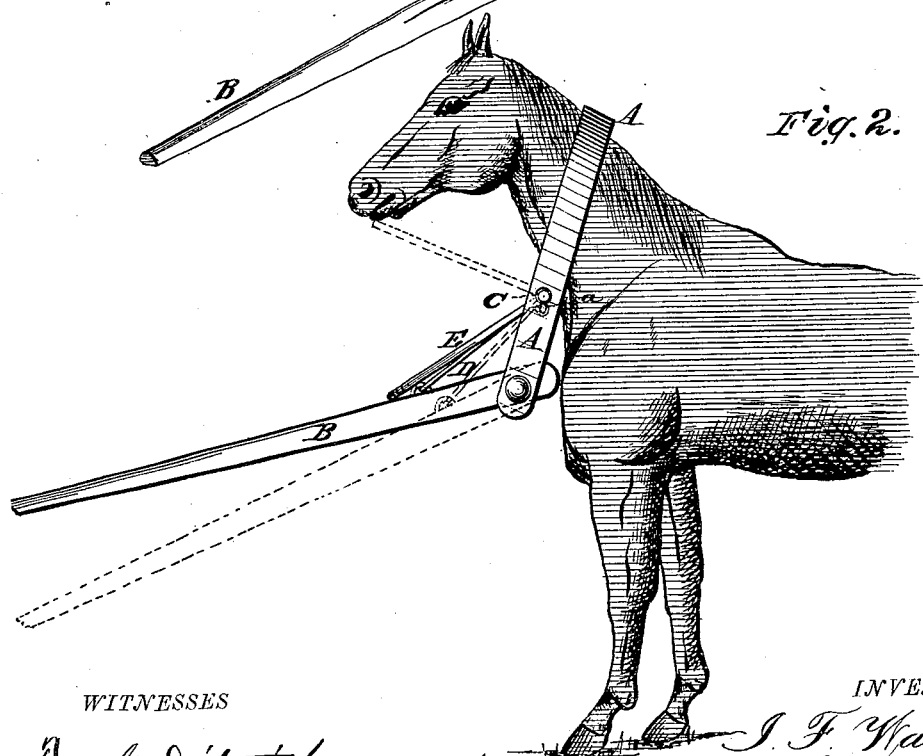
WITNESSES
INVENTORS:
I. F. Ward
R. G. Ward

UNITED STATES PATENT OFFICE.

ISAAC F. WARD AND RUBEN G. WARD, OF PERRY, NEW YORK.

ANIMAL-POKE.

SPECIFICATION forming part of Letters Patent No. 246,355, dated August 30, 1881.

Application filed May 13, 1881. (Model.)

*To all whom it may concern:*

Be it known that we, ISAAC F. WARD and RUBEN G. WARD, of Perry, in the county of Wyoming and State of New York, have invented certain new and useful Improvements in Animal-Pokes; and we do hereby declare that the following is a full, clear, and exact description of the invention, which will enable others skilled in the art to which it appertains to make and use the same, reference being had to the accompanying drawings, which form a part of this specification.

Figure 1 is a view in perspective of an animal-poke embodying our improvements, and Fig. 2 is a view of the same in place upon the animal's neck.

This invention relates to animal-pokes; and it consists in the improvements in the construction of the same hereinafter fully described, and particularly pointed out in the claim.

Referring by letter to the accompanying drawings, A designates the collar, and B the pivoted tongue or poke, of ordinary construction. We provide the collar A with a pivoted transverse round, C, and we connect the rear face of this round C, by a staple, a, and hooked rod D, with the tongue B, as shown. We also provide the round C with a forwardly-projecting wire loop or beater, E, which when the tongue B is violently depressed is as violently thrown up against the under jaw of the animal wearing the poke, thereby punishing the animal and breaking it from jumping fences or tearing them down.

The loop or beater, although it punishes the animal sufficiently, is not as severe as the barbs ordinarily used, and is therefore more humane and less likely to inflict any permanent injury upon the animal.

The device is quite simple and needs no further explanation. It is cheap, and will most effectually cure an animal from jumping or breaking down fences.

Having thus described the invention, what is claimed as new is—

In an animal-poke, the combination, with the collar A and tongue B, of the round C, loop or beater E, and the rod D, constructed and operating substantially as and for the purpose set forth.

In testimony that we claim the foregoing as our own we have hereto affixed our signatures in presence of two witnesses.

ISAAC F. WARD.
RUBEN G. WARD.

Witnesses:
G. H. WRIGHT,
THEODORE G. ROSS.